US008533455B2

(12) United States Patent
Haddad et al.

(10) Patent No.: US 8,533,455 B2
(45) Date of Patent: Sep. 10, 2013

(54) METHOD AND APPARATUS FOR COMBINING INTERNET PROTOCOL AUTHENTICATION AND MOBILITY SIGNALING

(75) Inventors: Wassim Haddad, West New York, NJ (US); Karl Norrman, Stockholm (SE); Conny Larsson, Täby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1122 days.

(21) Appl. No.: 12/129,419

(22) Filed: May 29, 2008

(65) Prior Publication Data
US 2008/0301434 A1    Dec. 4, 2008

Related U.S. Application Data

(60) Provisional application No. 60/940,741, filed on May 30, 2007.

(51) Int. Cl.
*H04L 9/32*    (2006.01)

(52) U.S. Cl.
USPC ............ 713/153; 713/168; 380/270; 380/281

(58) Field of Classification Search
USPC ........................................................ 713/153
See application file for complete search history.

(56) References Cited

U.S. PATENT DOCUMENTS

| | | | |
|---|---|---|---|
| 6,954,790 B2* | 10/2005 | Forslow | 709/227 |
| 7,574,523 B2* | 8/2009 | Traversat et al. | 709/238 |
| 7,813,511 B2* | 10/2010 | Leung et al. | 380/281 |
| 8,059,661 B2* | 11/2011 | Patel et al. | 370/395.54 |
| 8,090,828 B2* | 1/2012 | Leung et al. | 709/226 |
| 2003/0091030 A1* | 5/2003 | Yegin et al. | 370/352 |
| 2003/0092425 A1* | 5/2003 | Okazaki et al. | 455/411 |
| 2004/0014422 A1* | 1/2004 | Kallio | 455/41.1 |
| 2007/0064647 A1* | 3/2007 | Prasad | 370/331 |
| 2007/0154016 A1* | 7/2007 | Nakhjiri et al. | 380/270 |
| 2007/0204155 A1* | 8/2007 | Dutta et al. | 713/168 |
| 2007/0297611 A1* | 12/2007 | Yun et al. | 380/270 |
| 2008/0025263 A1* | 1/2008 | Pelkonen | 370/332 |

FOREIGN PATENT DOCUMENTS
WO    WO 2006068450 A1    6/2006

OTHER PUBLICATIONS

NPL: 3GPP TR 33.821 vo.2.0 (Apr. 2007).*
3GPP TR 33.821 Vo.2.0 (Apr. 2007) 3rd Generation Partnership Project: Technical Specification Group Services and Systems Aspects: Rationale and track of security decisions in Long Term Evolved (LTE) Ran / 3GPP System Architecture Evolution (SAE) (Release 8), p. 1-7 and 42-70: Section 7.4.
3GPP TS 23,402 VO.4.0 (Apr. 2007) 3rd Generation Partnership Project: Technical Specification Group Services and Systems Aspects; 3GPP System Architecture Evolution; Architecture Enhancements for non-3GPP accesses; Release 8 p. 1-7; Section 5.4; Fisure 4.2.2-1.

* cited by examiner

*Primary Examiner* — Kambiz Zand
*Assistant Examiner* — Yonas Bayou

(57) ABSTRACT

Methods and apparatuses for combining internet protocol layer authentication and mobility signaling are disclosed. Various embodiments for providing authentication and mobility signaling when a mobile node moves from a 3GPP access network to a non 3GPP access network and vice versa are described.

17 Claims, 8 Drawing Sheets

METHOD AND APPARATUS FOR COMBINING INTERNET PROTOCOL AUTHENTICATION AND MOBILITY SIGNALING

CROSS-REFERENCE TO RELATED APPLICATIONS

This application claims the benefit of U.S. Provisional Application No. 60/940,741 filed May 30, 2007, the disclosure of which is incorporated herein by reference.

BACKGROUND

The evolution of 3G is currently being specified in the Third Generation Partnership Project (3GPP). The concept of a trusted non-3GPP access would consist on allowing the link layer subscriber authentication to be performed by the home AAA server. (A non-3GPP access is defined as any access other than GERAN/UTRAN/EUTRAN). The authentication for non-3GPP accesses is done by first authenticating on the link layer, e.g., running Extensible Authentication Protocol Method for UMTS Authentication and Key Agreement (EAP/AKA) which requires several round trips. The Access Router (AR) in the trusted access network is typically the pass through authenticator in the EAP/AKA run. This is followed by another authentication on the IP layer between the Mobile Node (MN) and the Mobile IP Home Agent (HA) which is located in the Packet Data Network Gateway (PDN GW). The PDN GW is also the anchor point for 3GPP accesses. The IP layer authentication also results in security parameters and keys necessary to secure the mobility signaling. Consequently, the IP layer authentication will add latency to the link layer authentication.

In particular, it is wasteful to run two authentications in handover situations, where the delay is critical for real time applications. The authentication process in non-3GPP accesses is clearly inefficient and multiple authentication protocol runs are made.

Proxy Mobil IPv6 (PMIPv6) protocol is proposed to be used as a network initiated mobility protocol in System Architecture Evolution—Long Term Evolution (SAE/LTE). The suggestion is to run this protocol on the S5 interface (between the PDN GW and the S-GW) and S8b interface (between the PDN GW and the visited S-GW) reference points (See 3GPP TS 23.401).

PMIPv6 consists of allowing a Mobile Access Gateway (MAG) to advertise the 64-bit home prefix to the mobile node (MN), so that the MN believes that it is still attached to the home network, and thus, keeps its home address. The MAG is located in the access router (AR). In parallel the MAG sends a Proxy Binding Update (PBU) to the MN's HA, and request a binding between the MN's Home Address (HoA) and the MAG's egress interface address (i.e., the MAG's egress interface will play the role of the Care of Address (CoA)).

The MAG fetches the MN's HA's address and the MN's home prefix as well as the type of the address configuration, during or after a successful link layer authentication.

Compared to regular Mobile IP, this has the advantage of keeping the MN unaware of mobility events, and does not require any explicit security association between the MN and its HA (this is now taken care of by the MAG, and is assuming that the link between the HA the MAG is secure).

For more information on PMIPv6 refer to www.ietf.org/internet-drafts/draft-ietf-netlmm-proxy-mobileipv6-17.txt.

When multiple terminals share the same access link, e.g., as in WLAN, all terminals on that link see each others packets, and packets are, in a sense, transmitted directly between terminals. This has several implications for security. We below assume IPv6.

When a terminal first appears on the link, it will send a Router Solicitation message (RtSol), and is expecting the access router (AR) to respond with a Router Advertisement (RtAdv). The RtAdv contains the address prefix, which the terminal shall use to configure its IP address. An attacker present on the link may spoof the RtAdv in reply to the RtSol.

Assuming the terminal has received a RtAdv, and has built its IP address, it is supposed to send an address duplication detection message on the link, containing its IP address. If this address is already in use by someone else on the link, the terminal should generate a new address and perform the address duplication detection procedure again. Again, an attacker on the same link, may respond to all address duplication detection messages sent on the link, effectively denying all other terminals service.

A terminal wishing to send a packet to another terminal on the same link needs to resolve the IP addresses to a link layer addresses. This is done by the terminal, by asking on the link for the link layer address belonging to a certain IP address. The intention of the protocol used, is that only the true owner of the IP address will respond, but clearly any attacker may respond to this query.

These messages are part of the Neighbor Discovery protocols (see RFC2461 and RFC2462). To counter the above mentioned attacks, IETF has specified the Secure Neighborhood Discovery (SEND) protocol. The protocol is based on public key cryptography, where the addresses are bound to a private/public key pair (Cryptographically Generated Addresses, or CGAs), and all messages involved in the address management are digitally signed.

Generation of CGAs is somewhat heavy weight. Signing all address management messages induces quite some processing load on both terminals and the access router. Message sizes increases significantly when signatures and certificates needs to be added. Verification of revoked certificates induces more round trips, and load on the terminals and the access routers.

It would be advantageous to have a system and method for combining internet protocol authentication and mobility signaling. The present invention provides such a system and method.

SUMMARY

A method and apparatus for combining internet protocol layer authentication and mobility signaling using a packet data network gateway is described. In one embodiment a master key and a first interface identifier are received. A router solicitation and a second interface identifier are received, where the first interface identifier and the second interface identifier are identical. An integrity of the router solicitation is validated using the master key, the first interface identifier, and the second interface identifier.

A method and apparatus for combining internet protocol layer authentication and mobility signaling using a packet data network gateway is described. A stored master key is retrieved using a first interface identifier. A new interface identifier is generated. A roaming key is generated from the master key. The roaming key and a router advertisement are forwarded.

A method and apparatus for combining internet protocol layer authentication and mobility signaling using an access router are described. A message comprising a roaming key and a router advertisement is received, the router advertisement integrity protected with a first key. The roaming key is extracted from the message. The message is forwarded.

A method and apparatus for combining internet protocol layer authentication and mobility signaling using an access router is described. An integrity protected RtSol message is received. The RtSol message is tunneled to a packet data network gateway when a non-verifiable authentication option is detected in a packet.

A method and apparatus for combining internet protocol layer authentication and mobility signaling using a mobile node is described. A master key is established. The mobile node moves from a first access network to a second access network. A first key is derived from the master key. A RtSol message is integrity protected using the first key. The RtSol message is tunneled with an interface identifier.

A method and apparatus for combining internet protocol layer authentication and mobility signaling using a mobile node is described. A router advertisement integrity protected with a first key is received. An integrity of the router advertisement is determined using the first key. Subsequent router advertisement messages are received, where each subsequent router advertisement message is integrity protected using the roaming key.

An objective of the invention is to reduce the latency at handover. In particular, an objective is to combine IP layer authentication and mobility signaling in one half roundtrips.

Another objective is to provide a method for transporting a key between the PDN GW and the MAG which is also derivable by the MN.

Still another objective is to protect RtAdvs and neighbor discovery protocol messages without the use of Cryptographically Generated Addresses and public key operations in general i.e to provide SeND protocol features on the shared link.

BRIEF DESCRIPTION OF THE DRAWINGS

In the following section, the invention will be described with reference to exemplary embodiments illustrated in the figures, in which.

DETAILED DESCRIPTION

The present invention addresses an optimization of the IP layer authentication and security of the mobility signaling. The present invention also applies a combined approach, which provides network-based mobility, enhanced secure neighbor discovery (SeND) and a fast internet protocol (IP) layer authentication. These three features are critical for enabling successful deployment of combined 3GPP and non-3GPP access networks where the need for secure and fast roaming between different types of network access technologies is of great value. The present invention exploits the trust among nodes within the access network, in order to generate a master key (Ka) and later use that master key to generate different roaming key(s) and securely send the roaming keys to corresponding nodes. The master key is not used directly, however, other keys are derived from this master key. One key is used for network attachment, authentication and network mobility while other, so called roaming keys, are used for purposes similar to SeND and possibly for enabling network-based MIPv6 route optimization (RO) mode.

Figure 1:
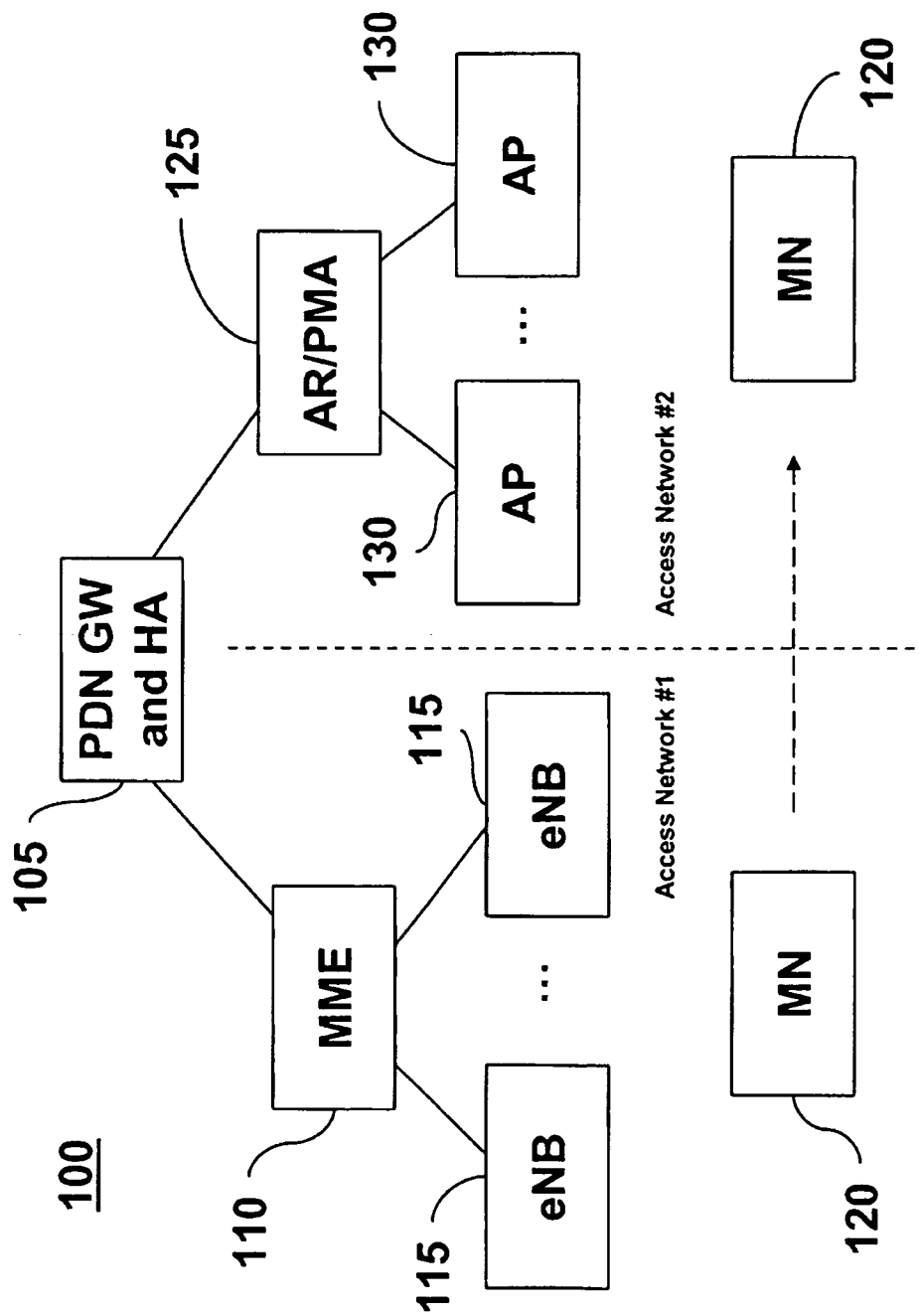
FIG. 1 depicts a system in accordance with one embodiment of the present invention.

FIG. 1 illustrates a system 100 comprising a first access network, e.g. SAE/LTE based 3GPP access, and a second access network, e.g. non-3GPP access. In this embodiment, mobile node 120 moves from Access Network #1, e.g., Evolved Universal Terrestrial Radio Access (EUTRA), to Access Network #2, e.g., a non-3GPP access. EUTRA comprises a plurality of eNBs 115. The plurality of eNBs 115 are connected to mobility management entity (MME) 110. MME 110 is connected to packet data network gateway (PDN GW) 105. Non-3GPP access comprises a plurality of access points (APs) 130. APs 130 are connected to AR/MAG 125. AR/MAG 125 is also connected to PDN GW 105.

The following description assumes that PDN GW 105 is also the MN's 120 home agent (HA)). The description below exemplarily assumes that MN 120 first attaches to EUTRAN, and then performs an inter-RAT handover to a non-3GPP access, but it should be understood that the access used in the initial attach can be any access that generates keying material as part of the authentication process.

Figure 2:
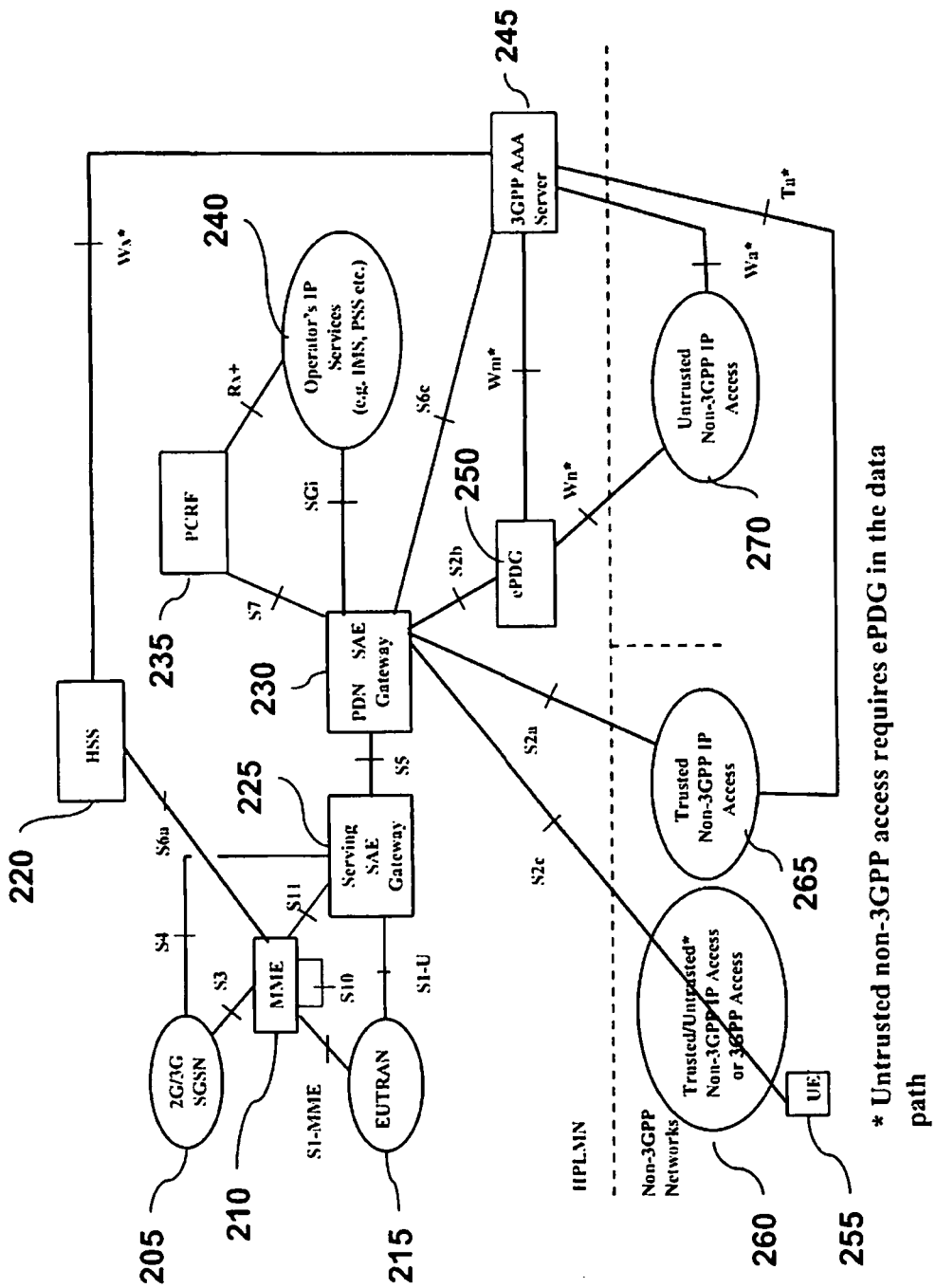
FIG. 2 depicts a system in accordance with one embodiment of the present invention.

FIG. 2 illustrates a non roaming architecture for non-3GPP accesses within SAE. The architecture comprises Serving GPRS (General Packet Radio Service) Support Node (SGSN) 205, MME 210, EUTRAN 215, Home Subscriber Server (HSS) 220, Serving SAE Gateway 225, PDN SAE Gateway 230, Policy Charging Rule Function (PCRF) 235, Operator IP Services 240, 3GPP AAA Server 245, evolved Packet Data Gateway (ePDG) 250, user entity (UE) 255, Trusted or Untrusted Non-3GPP IP Acces or 3GPP Access 260. Trusted Non-3GPP IP Access 265, and Untrusted Non-3GPP IP Access 270.

SGSN is connected to MME 210 via an S3 interface and Serving SAE Gateway 225, via an S4 interface. EUTRAN 215 is connected to MME 210 via an S1-MME interface and Serving SAE Gateway via an S1-U interface. MME 210 is connected to HSS 220 via an S6a interface and additionally provides communication via an S10 interface.

Serving SAE Gateway 225 communicates with PDN SAE Gateway 230 via an S5 interface. PDN SAE Gateway 230 communicates with PCRF 235 via an S7 interface. Operator IP Services 240 communicates with PDN SAE Gateway 230 via an SGi interface and PCRF 235 via an Rx+ interface.

Accesses 260, 265, 270 are provided to PDN SAE Gateway 230 via interfaces S2c, S2a, and S2b, respectively. Additionally, access to PDN SAE Gateway 230 via Untrusted Non-3GPP IP Access 270 requires communication via ePDG using the Wn* and S2b interfaces.

3GPP MA Server 245 communicates with Access 265, 270, ePDG 250, PDN SAE Gateway 230, and HSS 220 via interfaces Ta*, Wa*, Wm*, S6c, and Wx*, respectively.

The protocol disclosed by the present invention is applied using the following six steps:

1. Establish the master key Ka between MN 120 and PDN GW 105. This can be done, e.g., by deriving the key from the keying material derived during the initial authentication. In the setting of SAE and EUTRAN, first AKA is run between MN 120 and MME 110, which establishes a key called K_ASME (see 3GPP TR 33.821). From this key the master key Ka is derived. Ka is then transported to PDN GW 105 from MME 110 (or possibly via some other node in the network). At the same time as the Ka is transferred to PDN GW 105, an Interface Identifier (IID) is transferred with it. The IID is the 64-bit rightmost part of the IPv6 address, and must be unique on the link. Together with the 64-bit prefix, it constitutes the IPv6 address. The pair (Ka, IID) is stored in the PDN GW. The IID will be further described below.

Although the above-described embodiment shows derivation of a master key in a 3GPP access setting, this operation may also occur when a MN, e.g. UE 255 attaches to PDN SAE Gateway 230 using a non-3GPP access. In this case it the MN would typically authenticate to the PDN SAE Gateway 230 using an EAP-AKA, which results in a pair of keys, CK and IK. These keys can be the basis for the derivation of Ka. It is also possible to run a separate protocol between the MN and the PDN SAE Gateway 230 after the EAP-AKA run, comprising means to establish the key Ka (this could be preferable if the invention is to be incorporated at a point in time when legacy authentication protocols for non-3GPP access are already in place).

2. The MN 120, 255 moves from the EUTRAN into a non-3GPP access. Instead of performing all the authentication protocol runs described in the background, MN 120 derives a key HKa from the Ka using some suitable Key Derivation Function (KDF), and uses keying material derived from at least HKa to integrity protect the RtSol message sent to AR 125. The RtSol also includes the IID (generated in step 1). AR 125 will tunnel the RtSol to the MN's 120 home PDN GW 105, when it finds an authentication option in the packet that it cannot verify. Since the AR is the MAG, it received the address of PDN GW 105 from the home AAA server 245 (as well as the MN home prefix) during or after the link layer authentication. The PDN GW 105, 230 derives the same key HKa, and verifies the authenticity of the RtSol. If the verification succeeds, which means that the IID used by the MN in the RtSol as well as the authentication option is correct, MN 120, 255 is considered as authenticated in the new access. Note that the IID can be used as the source address in the RtSol message or it can be carried in the time stamp option (already defined in RFC3971).

When AR 125 detects the presence of an "unknown" (i.e., unable to validate it) authentication option in the RtSol message, AR 125 tunnels the message to MN 120 home PDN GW 105. This means that AR 125 will add an outer header, which carries the AR's egress interface address as source address.

When the MN moves to a non-3GPP access (e.g., Wimax, CDMA2000 and WLAN), it sends RtSol message to its current new access router (AR) (which is also known by PDN GW) using the 64-bit IID to configure its link local address and integrity protects the message using the key HKa. HKa is derived from Ka using some key derivation function (KDF), which takes Ka, the IID and possibly other parameters as input. All parameters must be present both in the MN and the PDN GW. Other parameters could include things such as counters, nonces or other synchronization information (which could also be sent in the RtSol), and identifiers for certain nodes or access types etc, to bind the scope of the key.

3. When the PDN GW/HA 105 receives the RtSol, it looks up the Ka, based on the IID carried in the RtSol and stored in its binding cache memory. When the Ka is found, the integrity of the RtSol can be validated. A new IID is generated and a roaming key Kr is derived from the master key Ka, by the PDN GW. The new IID is replacing the old IID in the PDN GW's cache. The key Kr is sent to the AR together with a RtAdv to the AR. The RtAdv is integrity protected using HKa. The PDN GW 105 also updates its binding cache memory using the MN's HoA and the MAG address (the source address of the packet). Hence the RtSol function works implicitly as a proxy binding update (PBU message) that is supposed to be sent by the MAG.

Since the IID is re-generated on each valid RtSol, it serves as a replay protection.

4. When AR 125 receives the RtAdv, it extracts the Kr from the message, and then forwards the router advertisement to MN 120. If the link between PDN GW 105 and AR 125 is not trusted, the link has to be cryptographically protected, otherwise an attacker may eavesdrop the link.

5. MN 120 checks the integrity protection of the RtAdv using the key HKa, and generates the next IID, exactly as the PDN GW did in step 3).

6. From now on all subsequent unicast RtAdv periodically sent to MN 120 by MAG 125 are integrity protected by Kr (which is also be derived by the MN) as well as the neighbor discovery protocol messages (see RFC2461) and these messages should be exchanged via the AR (that is how they get protected with each MN's Kr).

The following discussion describes the derivation and use of interface identifiers and roaming keys in more detail. Upon receiving the RtSol message, the home PDN GW 105 checks its cache memory for the link local IID. If found, PDN GW 105 proceeds to fetch the corresponding Ka to validate the message. After that, PDN GW 105 generates a roaming key (called Kr) and uses it to authenticate the RtAdv message, which is tunneled first to the MN's AR 125. In addition, the PDN 105 inserts Kr in the RtAdv message (e.g., destination option field in the outer header) and encrypts it using the shared key between the PDN GW and AR (or relies on that this link can under some circumstances be assumed secure). The PDN GW must also compute a new IID (nIID) and stores it with the previous one. Refreshing the IID is needed in order to prevent replay attacks and protect against a compromised AR. For this purpose, the PDN GW and the MN can compute the IID and Kr in the following way:

$$IID_{i+1} = First[64, SHA1("IID"|IID_i|Ka)]$$

Which means that the new IID is the first 64 bits of the SHA1 hash of a static identifier string, "IID", and the old IID concatenated with the Ka. It shall be noted that the new IID can be computed from the old one using any secure one-way function of the previous IID and Ka. This links the IIDs in a chained fashion. If one is worried about synchronization issues with this approach (e.g., if messages are lost), the IIDs can be derived as $$IID_i = PRF("IID", Ka, i, othr)$$

Where PRF is some cryptographic Pseudo Random Function, i is a nonce or a counter, and othr is some other information (e.g., access network identity, PDN GW identity, MN identity, access network type or some combination thereof). The purpose of the static identifier string is to assure that the IID will be different from the Kr (see below) if the same derivation function is used. The IID is derived the same way in the MN and in the PDN GW.

In addition, the PDN GW must not send the same Kr to each AR visited by the MN (this is to prevent ARs, that once were used by the MN, from attacking the MN by sending false Router Advertisements). For this purpose, the PDN GW and the MN must also refresh Kr each time a new IID is generated. The PDN GW and the MN can compute Kr in the following way:

$$Kri = PRF(\text{``}Kr\text{''}, Ka, i, \text{othr})$$

Here it shall be noted that the Kr could be derived in a chained fashion just as the IID was derived above.

After receiving the tunneled RtAdv message, AR 125 removes the outer header, stores Kr and the MN's MAC address and forwards the inner packet to MN 120.

All subsequent RtAdv messages are sent by AR 125 and must be authenticated with Kr (or a key derived from Kr and some other information known to the MN, e.g., network identity). In addition, all neighbor discovery messages sent/received by the MN must be exchanged via the AR and authenticated with Kr (or a key derived from) thus providing SeND features in case of a shared link (e.g., WLAN) without the need for CGA technology.

In case of Mobile IPv6 (MIPv6) being used, the MN can still use Ka to authenticate the binding updates sent to PDN GW 105, i.e., Ka is the bidirectional security association established with its PDN GW (i.e., HA). MN 120 should also use the IID to configure its CoA. Note that it is assumed that the MN's PDN GW is well aware about the capability of the MN to rely on MIPv6/PMIPv6, so that it can always use the AR source address carried in the outer header as a CoA for PMIPv6 or just the prefix combined with the MN's IID as CoA in case of MIPv6.

Figure 3:
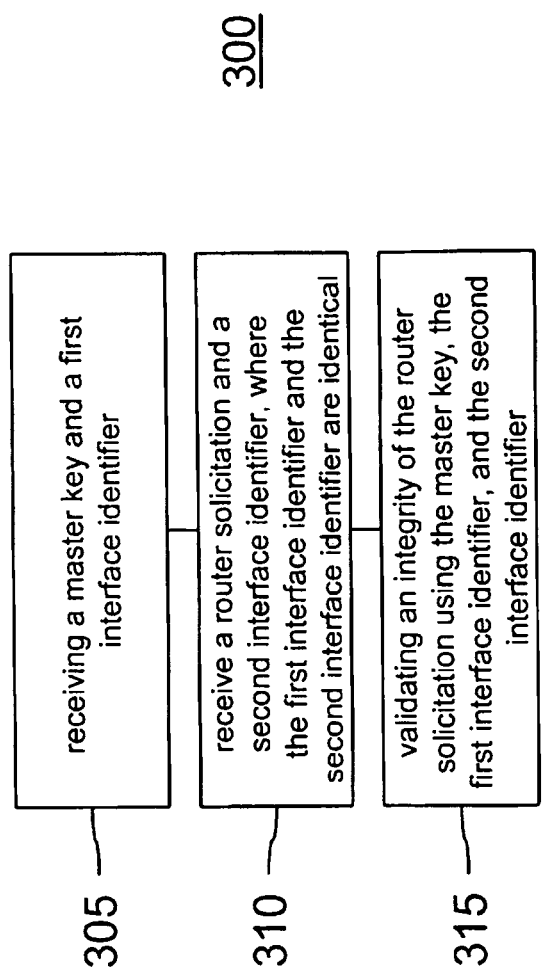
FIG. 3 illustrates a method for combining internet protocol layer authentication and mobility signaling using a packet data network gateway according to one embodiment of the present invention.

FIG. 3 illustrates a method 300 for combining internet protocol layer authentication and mobility signaling using a packet data network gateway. Method 300 begins at step 305. At step 305 a master key and a first interface identifier are received. A master key, Ka, is established between MN 120 and the PDN GW 105. This can be done, e.g., by deriving Ka from the keying material derived during the initial authentication. In the setting of SAE and EUTRAN, first Authentication and Key Agreement (AKA) is run between MN 120 and MME 110, which establishes a key called K_ASME (see 3GPP TR 33.401). From this key the master key Ka is derived. Ka is then transported to PDN GW 105 from MME 110 (or possibly via some other node in the network). At the same time as the Ka is transferred to PDN GW 105, an Interface Identifier (IID) is transferred with key, Ka. The IID is the 64-bit rightmost part of the IPv6 address, and must be unique on the link. Together with the 64-bit prefix, it constitutes the IPv6 address. The pair (Ka, IID) is stored in PDN GW 105. The IID will be further described below.

At step 310, a RtSol and an interface identifier are received, e.g., from AR 125. In one embodiment, the stored interface identifier and the interface identifier received from AR 125 are identical. At step 315, an integrity of the RtSol is validated using the master key, the stored interface identifier, and the interface identifier received from AR 125. When PDN GW/HA 105 receives RtSol, RtSol, PDN GW 105 looks up the stored Ka, based on the IID carried in the RtSol and the IID stored in its cache memory. When Ka is found, the integrity of the RtSol can be validated.

Figure 4:
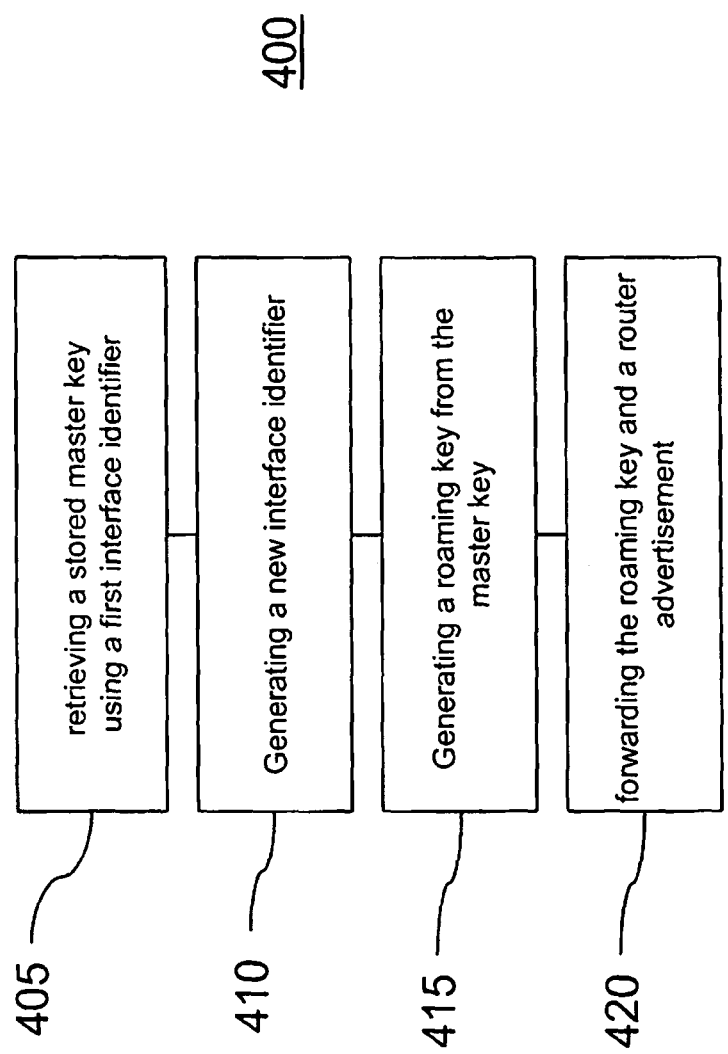
FIG. 4 illustrates a method for combining internet protocol layer authentication and mobility signaling using a packet data network gateway in accordance with one embodiment of the present invention.

FIG. 4 illustrates a method 400 for combining internet protocol layer authentication and mobility signaling using a packet data network gateway. At step 405, a stored master key is retrieved using the interface identifier received from AR 125 at step 310.

At step 410 a new interface identifier is generated. At step 415, a roaming key is generated from the master key, Ka. A new IID is generated and a roaming key, Kr, is derived from master key, Ka, by PDN GW 105. The new IID replaces the old IID in the PDN GW's 105 cache.

At step 420 roaming key, Kr, and a router advertisement, RtAdv, are forwarded. Key, Kr, is sent to AR 125 together with a RtAdv to AR 125. The RtAdv is integrity protected with HKa. PDN GW 105 also updates it binding cache memory using the MN's 120 HoA and the MAG address (the source address of the packet). Hence the RtSol function works implicitly as a proxy binding update (PBU message) that is supposed to be sent by MAG 125. Since the IID is re-generated on each valid RtSol, replay protection is achieved.

Figure 5:
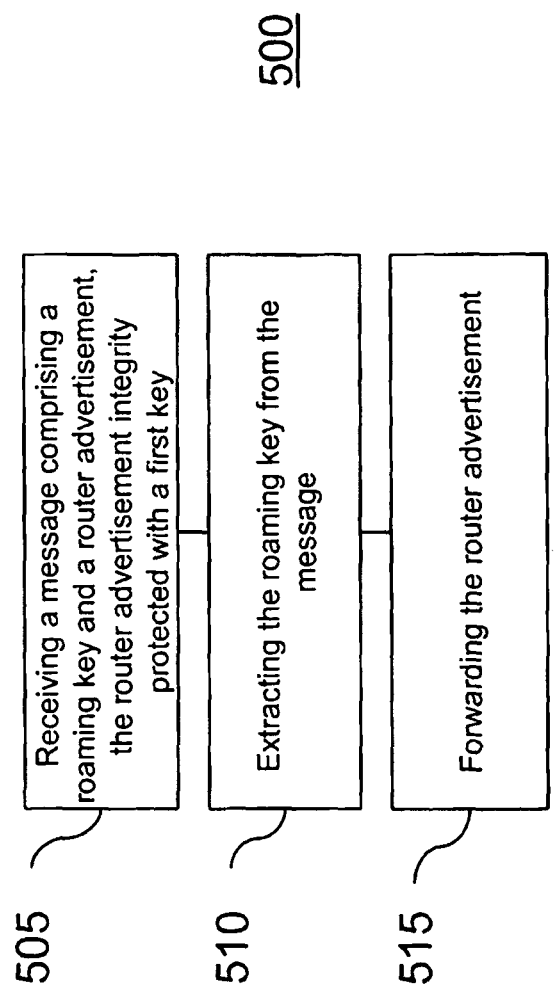
FIG. 5 illustrates a method for combining internet protocol layer authentication and mobility signaling using an access router, according to one embodiment of the present invention.

FIG. 5 illustrates a method 500 for combining internet protocol layer authentication and mobility signaling using an access router. Method 500 begins at step 505. At step 505, a message comprising a roaming key and a router advertisement are received. The router advertisement is integrity protected with key, HKa. At step 510, the roaming key is extracted from the message. At step 515, the router advertisement is forwarded. e.g., to MN 120. When the AR receives the message, AR 125 extracts Kr from the message, and then forwards the router advertisement to MN 120. If the link between PDN GW 105 and AR 125 is not trusted, the link is cryptographically protected.

Figure 6:
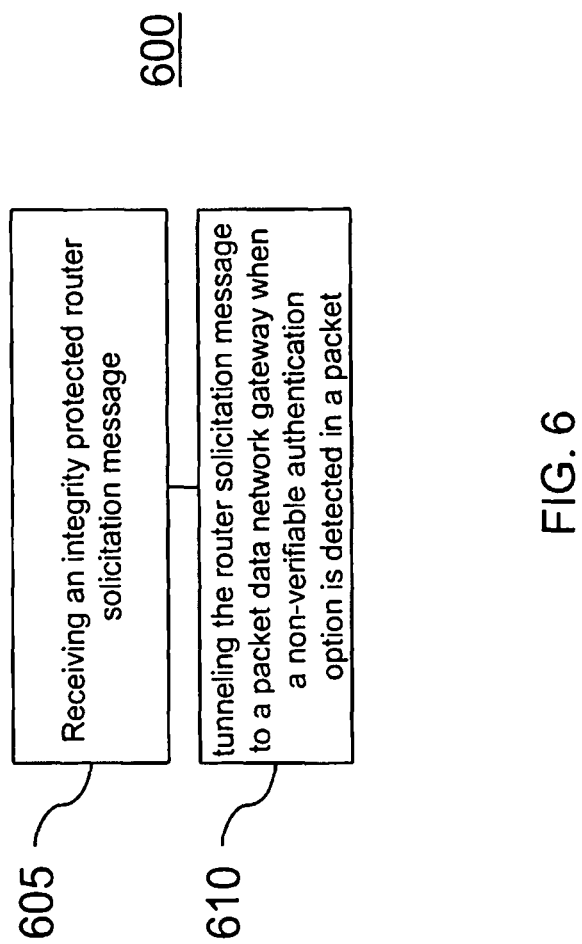
FIG. 6 illustrates a method for combining internet protocol layer authentication and mobility signaling using an access router, according to one embodiment of the present invention.

FIG. 6 illustrates a method 600 for combining internet protocol layer authentication and mobility signaling using an access router. Method 600 begins at step 605. At step 605 an integrity protected RtSol message is received. At step 610, the RtSol message is tunneled to a packet data network gateway when a non-verifiable authentication option is detected in a packet.

Figure 7:
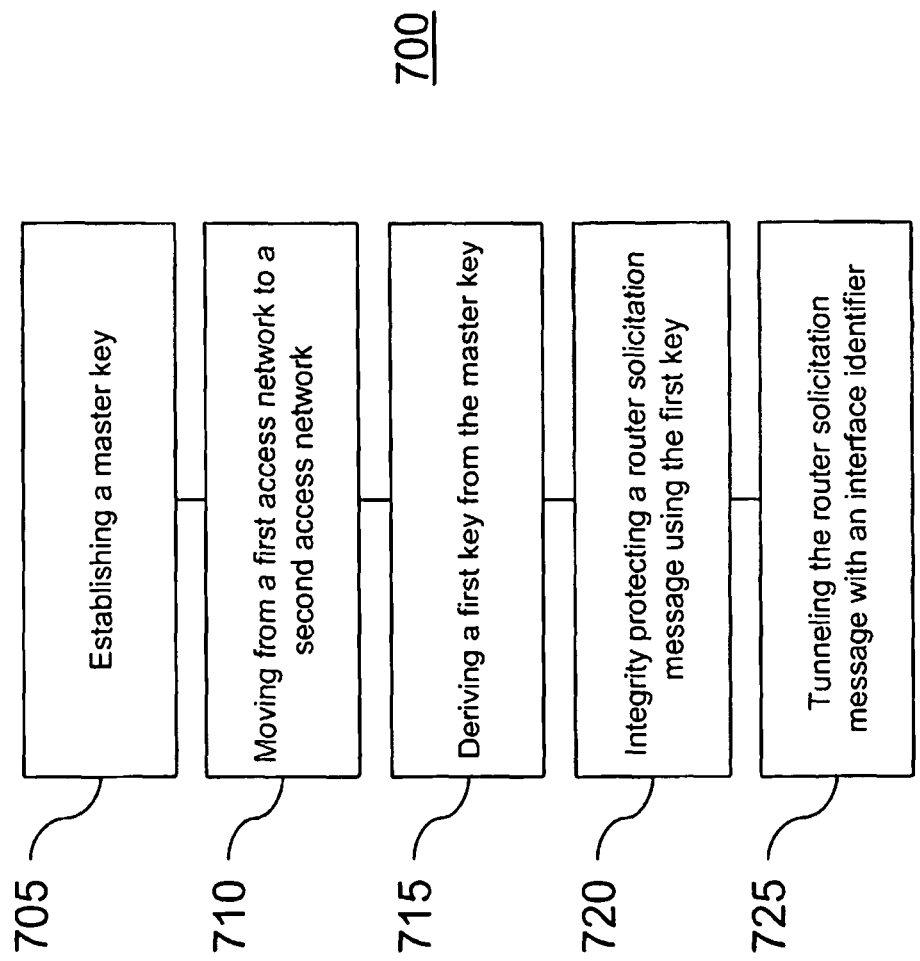
FIG. 7 illustrates a method for combining internet protocol layer authentication and mobility signaling using a mobile node, in accordance with one embodiment of the present invention.

FIG. 7 illustrates a method 700 for combining internet protocol layer authentication and mobility signaling using a mobile node. Method 700 begins at step 705. At step 705, a master key is established. At step 710, the MN 120 moves from a first access network to a second access network. At step 715, a first key, i.e., key, HKa, is derived from the master key. At step 720, a RtSol message is integrity protected using key, HKa. At step 725, the RtSol message is forwarded, e.g., to AR 125 through AP 130.

Figure 8:
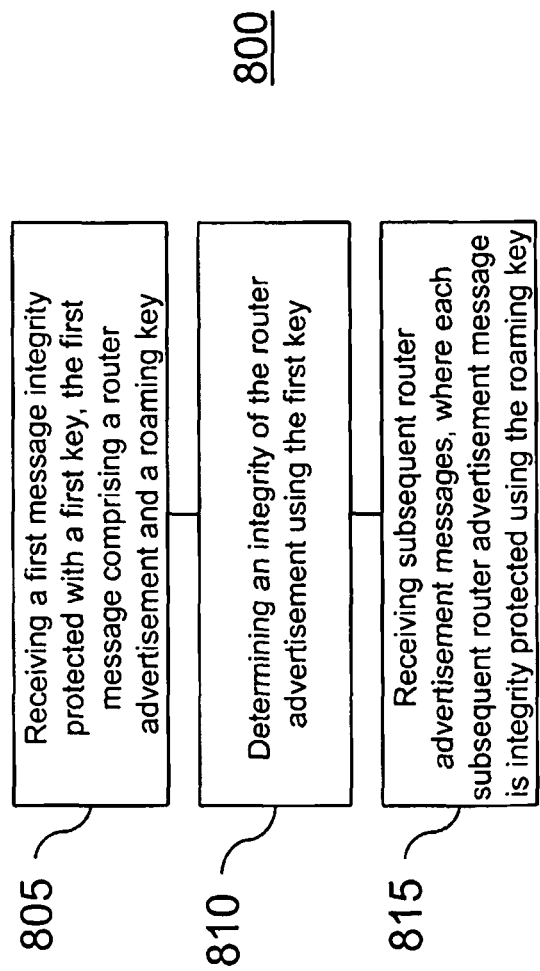
FIG. 8 illustrates a method 800 for combining internet protocol layer authentication and mobility signaling using a mobile node, in accordance with one embodiment of the present invention.

FIG. 8 illustrates a method 800 for combining internet protocol layer authentication and mobility signaling using a mobile node. Method 800 begins at step 805. At step 805, a router advertisement integrity protected with a first key, i.e., key, HKa, is received. At step 810, an integrity of the router advertisement is determined using the first key. At step 815, subsequent router messages are received, where each subsequent router advertisement message is integrity protected using the roaming key.

In an alternative embodiment a possible optimization is achieved comprising expanding the security credential exhange between the PDN GW 105, 230 and an HSS 220 to a bidirectional communication. This means that PDN GW 105, 230 will send the IID to HSS 220 when it receives the [Ka, IID] tuple from MME 110, 210 (or its equivalent in the access network where MN 120, 255 made its first attach). In this case, during the EAP link layer authentication after the handover, MN 120, 255 inserts its IID in the EAP response message. When the AR 125 requests the authentication data from home AAA 245, it includes the IID. Home AAA 245 gets the CoA for MN 120, 255 from the source address of this message, i.e., the egress interface of the AR (MAG). Then home AAA 245 notifies PDN GW/HA 105, 230 about the new CoA of MN 120, 255. This serves as a proxy binding update. Upon getting this information, PDN GW 105, 230 sends the Kr to AR (PDN) 125. AR 125 can now use the Kr to integrity protect the RtAdv, after the link layer authentication has finished. The IID can be integrity protected by a key derived from Ka, e.g., HKa. This provides the authentication of the user on the IP layer.

In one embodiment, HSS 220 computes the IID itself (instead of the PDN GW as in the case described earlier).

Advantages of the present invention include, but are not limited to:

- Re-authentication when performing a handover to a non-3GPP network does not require a complete AKA.
- RtSol messages cannot be replayed, since the PDN GW only accepts such messages carrying "the next" IID.
- Authenticated RtSol also serves as network mobility signaling messages and thus the IP handoff latency is significantly reduced.
- There is no need to sign duplicate address detection (DAD) messages or neighbor discovery protocol messages, as these (and their responses) are all sent via the AR, and each MN integrity protects these messages with a shared key between the AR and itself.
- The 64-bit IID can also be transported in the timestamp option and thus enables the MN to use the unsolicited address when sending the RtSol message to the AR. If it is not, the IID is part of the source address.

What is claimed:

1. A method for combining internet protocol layer authentication and mobility signaling using a packet data network gateway, comprising:
    receiving a master key derived from a session (K_ASME) key and a first interface identifier;
    storing the master key and the first interface identifier in the packet data network gateway;
    after a mobile node moves from a 3GPP access network to a non-3GPP access network, receiving a router solicitation and a second interface identifier from the mobile node, via an access router in the non-3GPP access network, where the first interface identifier and the second interface identifier are identical; and
    validating an integrity of the router solicitation using the master key, the first interface identifier, and the second interface identifier;
    generating a new interface identifier;
    storing the new interface identifier in the packet data network gateway by replacing the stored first interface identifier;
    generating a roaming key from the master key;
    forwarding the roaming key and a router advertisement to the mobile node, via the access router, enabling all subsequent messages to the mobile node to be integrity protected.

2. The method of claim 1, wherein the first interface identifier is received from a first node and the second interface identifier is received from a second node.

3. The method of claim 1, wherein the master key is derived from a K_ASME key.

4. The method of claim 1, wherein the first interface identifier and the second interface identifier comprise a 64-bit rightmost part of an IPv6 address.

5. The method of claim 1, wherein the master key and the first interface identifier are stored in a packet data network gateway.

6. The method of claim 1, wherein the second interface identifier is used as a source address in the router solicitation.

7. The method of claim 1, wherein the second interface identifier is carried in a time stamp field.

8. The method of claim 7, wherein the time stamp field is carried in a router solicitation message.

9. The method of claim 1, further comprising upon receiving the router solicitation, looking up the stored master key using the received second interface identifier and the stored first interface identifier.

10. The method of claim 1, wherein the router advertisement is integrity protected with a second key derived from at least the master key.

11. The method of claim 10, wherein the second key is derived from at least the master key using a key derivation function.

12. The method of claim 1, wherein a new interface identifier is generated for each validated router solicitation message.

13. A method for combining internet protocol layer authentication and mobility signaling using an access router, comprising:
    receiving a message comprising a roaming key and a router advertisement, the router advertisement integrity protected with a first key;
    extracting the roaming key from the message; and
    forwarding the message to a mobile node, enabling all subsequent messages to the mobile node to be integrity protected.

14. The method of claim 13, wherein a link for receiving the outer advertisement is cryptographically protected.

15. The method of claim 13, wherein subsequent router advertisements are integrity protected with the roaming key.

16. An apparatus for combining internet protocol layer authentication and mobility signaling using a packet data network gateway, comprising:
    a processor configured for receiving a master key derived from a session (K_ASME) key and a first interface identifier;
    the processor further configured for storing the master key and the first interface identifier in the packet data network gateway;
    the processor further configured for receiving, after a mobile node moves from a 3GPP access network to a non-3GPP access network, a router solicitation and a second interface identifier from the mobile node, via an access router in the non-3GPP access network, where the first interface identifier and the second interface identifier are identical; and
    the processor further configured for validating an integrity of the router solicitation using the master key, the first interface identifier, and the second interface identifier;
    the processor further configured for generating a new interface identifier;
    the processor further configured for storing the new interface identifier in the packet data network gateway by replacing the stored first interface identifier;
    the processor further configured for generating a roaming key from the master key;
    the processor further configured for forwarding the roaming key and a router advertisement to the mobile node, via the access router, enabling all subsequent messages to the mobile node to be integrity protected.

17. An apparatus for combining internet protocol layer authentication and mobility signaling using an access router, comprising:

a processor configured for receiving a message comprising a roaming key and a router advertisement, the router advertisement integrity protected with a first key;

the processor further configured for extracting the roaming key from the message; and the processor further configured for forwarding the message to a mobile node, enabling all subsequent messages to the mobile node to be integrity protected.

\* \* \* \* \*

UNITED STATES PATENT AND TRADEMARK OFFICE
CERTIFICATE OF CORRECTION

PATENT NO. : 8,533,455 B2  
APPLICATION NO. : 12/129419  
DATED : September 10, 2013  
INVENTOR(S) : Haddad et al.

Page 1 of 1

It is certified that error appears in the above-identified patent and that said Letters Patent is hereby corrected as shown below:

On the Title Page, Item (56), under "OTHER PUBLICATIONS", in Column 2, Line 6, delete "42-70:" and insert -- 42-70; --, therefor.

In the Drawings

In Fig. 1, Sheet 1 of 8, for Tag "125", in Line 1, delete "AR/PMA" and insert -- AR/MAG --, therefor.

In the Specification

In Column 4, Line 49, delete "Acces" and insert -- Access --, therefor.

In Column 5, Line 1, delete "MA" and insert -- AAA --, therefor.

In Column 8, Line 26, delete "forwarded." and insert -- forwarded, --, therefor.

In Column 8, Line 58, delete "exhange" and insert -- exchange --, therefor.

In the Claims

In Column 10, Line 32, in Claim 14, delete "outer" and insert -- router --, therefor.

Signed and Sealed this  
Twenty-second Day of July, 2014

Michelle K. Lee  
*Deputy Director of the United States Patent and Trademark Office*